Figure 2:
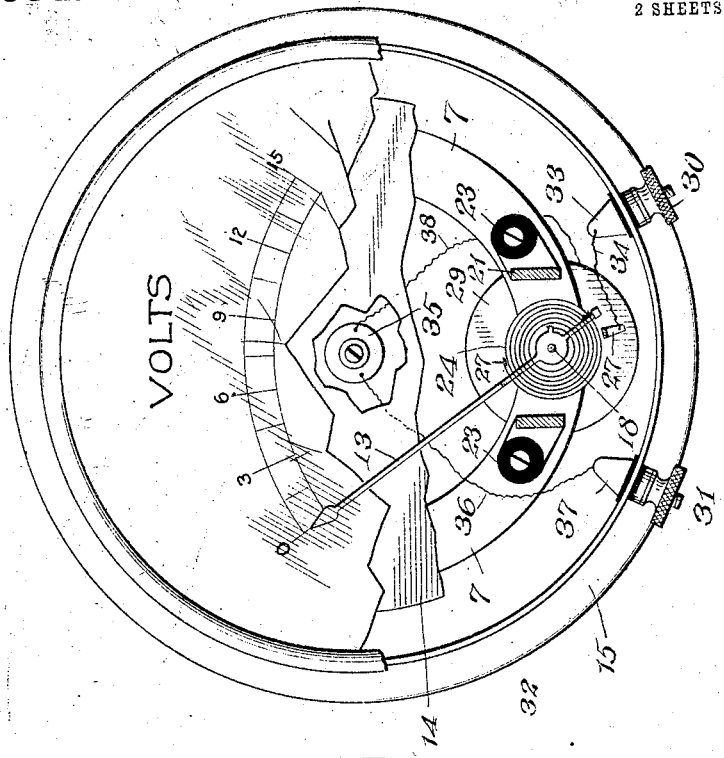

W. E. BEEDE.
ELECTRICAL MEASURING INSTRUMENT.
APPLICATION FILED MAR. 22, 1911.

1,027,684.

Patented May 28, 1912
2 SHEETS—SHEET 1.

WITNESSES
Wm. Ashley Kelly
Victor D. Borst

INVENTOR
Walter E. Beede
BY
Henry D. Williams
ATTORNEY

W. E. BEEDE.
ELECTRICAL MEASURING INSTRUMENT.
APPLICATION FILED MAR. 22, 1911.
1,027,684.
Patented May 28, 1912.
2 SHEETS—SHEET 2.
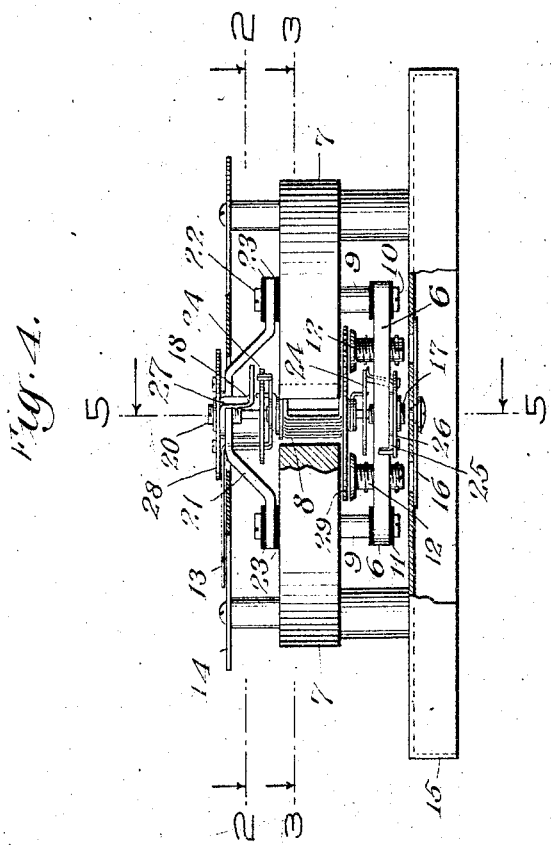
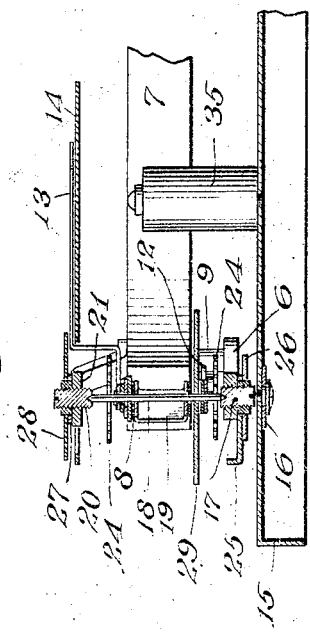
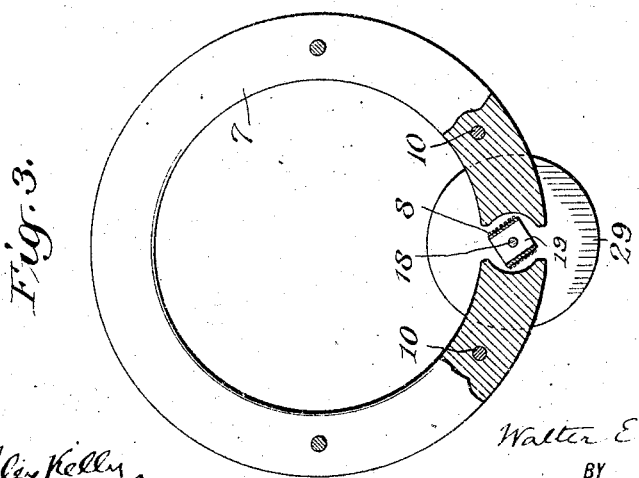
WITNESSES
INVENTOR.
Walter E. Beede
BY
Henry D. Williams
ATTORNEY.

UNITED STATES PATENT OFFICE.

WALTER E. BEEDE, OF NEW YORK, N. Y.

ELECTRICAL MEASURING INSTRUMENT.

1,027,684.

Specification of Letters Patent. Patented May 28, 1912.

Application filed March 22, 1911. Serial No. 616,098.

*To all whom it may concern:*

Be it known that I, WALTER E. BEEDE, a citizen of the United States, residing in the borough of Manhattan, city of New York, in the county of New York and State of New York, have invented certain new and useful Improvements in Electrical Measuring Instruments, of which the following is a specification, reference being had therein to the accompanying drawings, forming part thereof.

My invention relates generally to electrical measuring instruments of that class in which a magnetic shunt or magnetic bridge is employed to adjust or otherwise modify the magnetic field of the instrument; and my invention more particularly relates to galvanometers of the D'Arsonval type.

The general objects of my invention are accuracy of indication, simplicity of construction, and inexpensiveness of manufacture.

A more particular object of my invention is to provide improved means for adjusting the magnetic field to compensate for the gradual loss in magnetism of a permanent field-magnet.

Another object of my invention is to obviate any direct action or other interfering effect of such magnetism-adjusting means or compensating means upon the armature.

Another object is to provide an improved damping device for the armature.

Another object of my invention is to reduce the number of parts by combining a large number of functions in a few parts.

Other objects of my invention will hereinafter appear.

My invention includes means, such as a magnetic bridge for the opposed poles of a field magnet, forming a magnetic shunt around the end of a rotative coil or other form of pivoted armature (so that the armature will not be directly affected thereby) and modifying and providing for adjusting the intensity or density of the magnetic field by which the armature is influenced, enabling the magnetic force to which the armature is exposed to be corrected from time to time to harmonize or agree with the calibrations of the instrument, particularly to correct any false indication due to the gradual weakening of a permanent field magnet.

Also, as a feature of my invention, the magnetic bridge constitutes a pivotal support for the armature, the magnetic adjustment being effected by means of adjustable pole-pieces carried by the bridge, the latter being spaced from and non-magnetically supported on the magnet.

My invention also includes a damping device combined with the magnetic shunt; for example, a damping disk rotatively carried by the armature and adapted to move between the magnet poles and one or more adjustable pole-pieces carried by the magnetic bridge.

My invention also includes several features of construction and combinations of parts, as will appear from the following description.

I shall now describe the galvanometer illustrated in the accompanying drawings and embodying my invention and shall thereafter point out my invention in claims.

Figure 1:
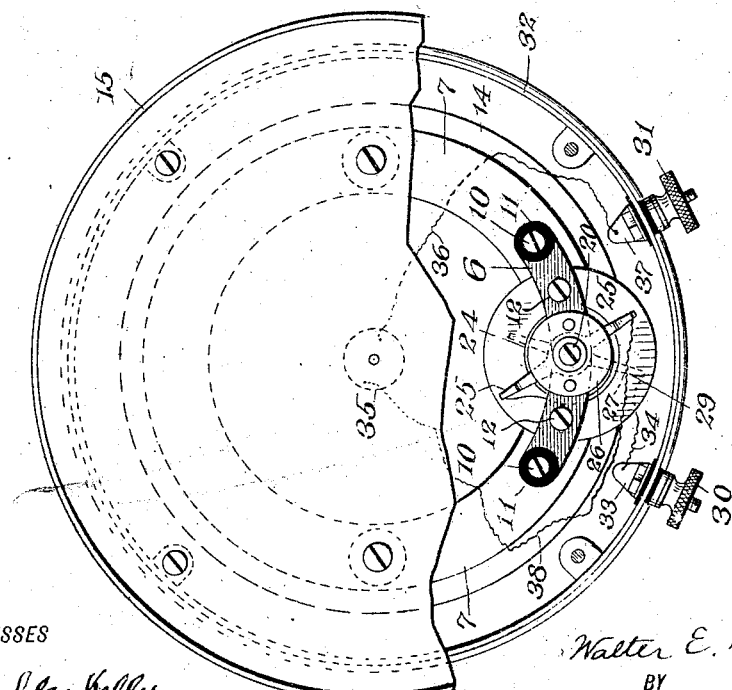

Figure 1 is a rear view of the instrument with the casing partly broken away. Fig. 2 is a front view, partly in section on a plane indicated by the line 2—2 in Fig. 4. Fig. 3 is a partial section on a plane indicated by the line 3—3 of Fig. 4, as viewed from above. Fig. 4 is a side view as seen from below in Fig. 2, with the top part of the casing removed and other parts broken away. Fig. 5 is a partial vertical section on a plane indicated by the line 5—5 of Fig. 4 as viewed from the right.

The galvanometer illustrated in the drawings has a bar 6 of soft iron extending across or bridging the opposed poles of a permanent field magnet 7, the bar 6 being located at the end and forming a magnetic bridge or magnetic shunt around the end of a rotative armature coil 8 located in the magnetic field of the magnet 7 and shown as placed between the spaced magnetic poles. The bar 6 is shown of curved form to correspond to the curvature of the ring-shaped magnet 7, and is spaced from and supported on the magnet by non-magnetic blocks 9 and screws 10; and the bridge bar 6 is electrically insulated from the magnet 7 by insulating rings 11.

The bridge bar 6 carries adjustable iron pole-pieces 12, a pole-piece for each magnet pole, shown as having inner heads provided with stems adjustably screw-threaded through the bar 6, the outer ends of the stems having therein screw-driver notches, as shown, for conveniently effecting adjustment of the pole-pieces 12 to or from the corresponding magnet poles, to thereby divert more or less of the magnetic flux through the pole-pieces 12 and bridge bar 6, and to that extent away from the armature coil 8. As the bridge 6 is located at the end of the rotative coil 8, substantially in axial line therewith, the coil 8 will not be directly affected by the magnetic bridge 6 and its pole-pieces 12, but will be indirectly affected through the weakening to a greater or less extent of the magnetic field to which the coil 8 is exposed and to which it is responsive. Should the permanent magnet 7 become weakened, the pole-pieces 12 may be accordingly adjusted farther away from the magnet poles, to then divert less of the magnetic force and thus proportionately increase—or rather restore—the magnetic density of that portion of the field between the magnetic poles and occupied by the armature coil 8, thereby compensating for the loss in magnetism of the magnet 7 and correcting the indications of a pointer 13 carried by the coil 8 in reference to a calibrated dial 14. The pole-pieces 12 may thus be conveniently adjusted by inserting a screw-driver through openings provided for the purpose in the base-plate 15 of an inclosing casing for the instrument, these screw-driver holes being normally covered by a rotative cover-plate 16 pivoted on the base-plate 15, thus rendering it unnecessary to take the instrument apart or to remove any part of it in order to effect this adjustment. By means of such magnetic adjustment the instrument may at any time, by comparison with a standard instrument, be brought back to its correct indication as originally calibrated. The bridge bar 6 also serves as a pivotal support or axial support for the rotative armature coil 8, thus simplifying the construction and reducing the number of parts.

The bar 6 carries a step bearing 17 in which is pivoted the conical end of an arbor 18 on which is mounted a non-magnetic coil-frame or bobbin 19 upon which in turn is wound the armature coil 8. The other end of the arbor 18 is similarly pivoted in a step bearing 20 carried by a non-magnetic arbor-support 21 secured to the adjacent side of the magnet 7 by screws 22 and electrically insulated from the magnet by insulating rings 23. The pointer 13 is also mounted directly on the arbor 18 so as to partake of the movement of the coil 8 and its frame 19. The pointer 13 is brought to the zero indication by means of usual opposed adjustable hair-springs 24 which also serve as leads for electric current to and from the coil 8. At their inner ends the hair-springs 24 are rotatively secured to the arbor 18 and at their outer ends are connected to frictionally hold adjustment-levers. The lower or inner adjustment-lever 25 is frictionally held against the lower side of the bridge bar 6 by a friction-disk 26 adjustably held in place by screws, as shown in the drawings. The upper adjustment-lever 27 is frictionally held against the upper or outer side of the arbor-support 21 by a larger friction-disk 28 adjustably held in place by screws, as shown. The upper and larger friction-disk 28 is slightly elevated above the dial 14 to provide a suitable slot through which the pointer 13 projects from its connection with the arbor 18 to an indicating position above the dial 14.

Oscillations of the pointer 13 are prevented and the instrument rendered dead beat by a magnetically influenced damping device combined directly with and coöperative with the magnetic bridge 6 and its pole-pieces 12. This damping device is shown as a damping disk 29, which may be of any suitable electrically conductive material, such as aluminum, rotatively carried by the arbor 18 and coil-frame 19 at the lower end of the frame 19 and coil 8, so as to lie in proximity to the poles of the magnet 7 and between these poles and the pole-pieces 12 of the bridge bar 6, thus being located in a strong portion of the magnetic field. The damping effect of the damping disk 29 will be proportionately adjusted along with the magnetic adjustment so that this disk will under all conditions and adjustments produce the proper damping effect. The pole-pieces 12 are prevented from coming in contact with the damping disk 29 or with the lower hair-spring 24, by means of small limiting pins projecting from the pole-pieces 12, as shown in Figs. 1 and 4, and adapted to engage the bridge bar 6.

The instrument is provided with binding posts 30 and 31, shown as extending through the cylindrical side wall of the front part 32 of the inclosing case and as insulated therefrom. The circuit of the instrument may be traced from one of these binding posts through the armature coil 8 back to the other binding post. Starting, for example, at the post 30 (shown at the right in Fig. 2 and at the left in Fig. 1) the circuit leads from a contact plate 33, by a flexible wire 34, to the free end of the upper adjustment-lever 27, through the upper hair-spring, to the armature coil 8. From the coil 8 the circuit continues through the lower hair-spring, to the lower adjustment-lever 25, from the free end of which a flexible wire 38 leads to a current-modifying resistance coil 35, secured to the back plate 15 of the instrument casing, and a flexible conductor 36 connects the other terminal of the resistance 35 with a contact plate 37 connected to the inner end of the other binding post 31. The resistance coil 35 is employed in a manner well known in the art to secure the original calibration of the instrument.

It is also to be noted that the hair-springs 24 have at their inner ends insulated connection with the arbor 18, as is usual in this type of instrument.

It is obvious that various modifications may be made in the construction shown in the drawings and above particularly described within the principle and scope of my invention.

I claim:

1. A galvanometer comprising, in combination, a field magnet, a rotative armature responsive to the magnetic influence of the field magnet, and means forming a magnetic shunt around the end of the armature to modify the influence of the magnetic field upon the armature.

2. A galvanometer comprising, in combination, a field magnet, a rotative armature responsive to the magnetic influence of the field magnet, and means located at the end of the armature for weakening the portion of the magnetic field occupied by the armature.

3. A galvanometer comprising, in combination, a field magnet, a rotative armature responsive to the magnetic influence of the field magnet, and means located at the end of the armature for adjusting the strength of that portion of the magnetic field occupied by the armature.

4. A galvanometer comprising, in combination, a permanent magnet, a rotative coil responsive to the magnetic influence of such magnet, and means for diverting magnetic flux around the end of the coil.

5. A galvanometer comprising, in combination, a permanent magnet, a rotative coil responsive to the magnetic influence of such magnet, and means located at the end of the coil for modifying the magnetic density of that portion of the field occupied by the coil.

6. A galvanometer comprising, in combination, a permanent magnet, a rotative coil responsive to the magnetic influence of such magnet, and means located at the end of the coil for adjusting the strength of that portion of the magnetic field occupied by the coil.

7. A galvanometer comprising, in combination, a field magnet having opposed poles producing a magnetic field, a rotative armature in the field and responsive thereto, and a magnetic bridge constituting a support for the armature.

8. A galvanometer comprising, in combination, a field magnet having opposed poles producing a magnetic field, a rotative armature in the field and responsive thereto, and an adjustable magnetic bridge forming a pivotal support for the armature.

9. A galvanometer comprising, in combination, a permanent magnet having opposed poles producing a magnetic field, a rotative coil located in and responsive to the field, and a magnetic bridge forming a pivotal support for the coil.

10. A galvanometer comprising, in combination, a permanent magnet having opposed poles producing a magnetic field, a rotative coil located in and responsive to the field, and an adjustable magnetic bridge forming a pivotal support for the coil.

11. A galvanometer comprising, in combination, a permanent magnet having opposed poles producing a magnetic field, a rotative coil located in and responsive to the field, a magnetic bridge for the poles spaced therefrom, and an adjustable pole-piece carried by the magnetic bridge.

12. A galvanometer comprising, in combination, a permanent magnet having opposed poles producing a magnetic field, a rotative coil located in and responsive to the field, a magnetic bridge for the poles spaced therefrom, and for each pole a pole-piece carried by the bridge and each independently adjustable to and from its corresponding magnet pole.

13. A galvanometer comprising, in combination, a permanent magnet having opposed poles producing a magnetic field, a rotative coil located in and responsive to the field, a magnetic bridge spaced from the magnet poles and located at the end of and forming an axial support for the coil, and pole-pieces carried by the bridge and adjustable in reference to the magnet poles.

14. A galvanometer comprising, in combination, a permanent magnet having opposed poles producing a magnetic field, a rotative coil located in and responsive to the field, a magnetic bridge for the poles located at the end of and forming an axial support for the coil, a non-magnetic support supporting the bridge on the magnet in spaced relation thereto, and an adjustable pole-piece carried by the bridge.

15. A galvanometer comprising, in combination, a permanent magnet having opposed poles producing a magnetic field, a rotative coil located in and responsive to the field, a magnetic bridge for the poles located at the end of the coil and spaced from the magnet, and a pole-piece screw-threaded through the bridge so as thereby to be adjustable relatively to a magnet pole.

16. A galvanometer comprising, in combination, a permanent magnet having opposed poles producing a magnetic field, a rotative coil located in and responsive to the field, a magnetic bridge for the poles located at the end of the coil and forming a pivotal support therefor, a non-magnetic support for the bridge connecting the bridge to the magnet and spacing it therefrom, and pole-pieces adjustably screw-threaded through the bridge.

17. A galvanometer comprising, in combination, a field magnet, a rotative armature responsive to the magnetic influence of the field magnet, means forming a magnetic shunt around the armature to modify the magnetic influence to which the armature is subjected, and a magnetically influenced damping device coöperative with such means to damp oscillations of the armature.

18. A galvanometer comprising, in combination, a field magnet, a rotative armature located in the magnetic field and responsive to the magnetic influence of the field magnet, means forming an adjustable shunt field around the armature, and a magnetically influenced damping device located in the shunt field and connected to the armature to rotate therewith.

19. A galvanometer comprising, in combination, a permanent magnet, a rotative coil responsive to the magnetic influence of such magnet, means for diverting magnetic flux around the coil, and a magnetically influenced damping device coöperative with such means to damp oscillations of the armature.

20. A galvanometer comprising, in combination, a permanent magnet, a rotative coil located in the magnetic field and responsive to the magnetic influence of such magnet, means forming an adjustable shunt field around the coil, and a magnetically influenced damping device located in the shunt field and movable with the coil.

21. A galvanometer comprising, in combination, a field magnet having opposed poles producing a magnetic field, a rotative armature in the field and responsive thereto, a damping device rotatively carried by the armature, and a magnetic bridge around the end of the armature to modify the magnetic influence to which the armature and the damping device are subjected and forming a pivotal support for the armature.

22. A galvanometer comprising, in combination, a field magnet having opposed poles producing a magnetic field, a rotative armature in the field and responsive thereto, a damping device rotatively carried by the armature, and an adjustable magnetic bridge around the end of the armature for adjusting the magnetic strength of the field to which the armature and the damping device are exposed.

23. A galvanometer comprising, in combination, a permanent magnet having opposed poles producing a magnetic field, a rotative coil located in and responsive to the field, a magnetic bridge around the end of the coil and forming a pivotal support for the coil, and a damping plate rotatively carried by the coil between a magnet pole and the bridge.

24. A galvanometer comprising, in combination, a permanent magnet having opposed poles producing a magnetic field, a rotative coil located in and responsive to the field, an adjustable magnetic bridge around the end of the coil and forming a pivotal support therefor, and a damping plate rotatively carried by the coil between a magnet pole and such bridge.

25. A galvanometer comprising, in combination, a permanent magnet having opposed poles producing a magnetic field, a magnetic bridge for the poles spaced from the magnet, an adjustable pole-piece carried by such bridge, and a damping plate rotatively carried by the coil between a magnet pole and the adjustable pole-piece.

26. A galvanometer comprising, in combination, a permanent magnet having opposed poles producing a magnetic field, a rotative coil located in and responsive to the field, a magnetic bridge for the poles located at the end of the coil and forming a pivotal support therefor, a non-magnetic support for the bridge connecting the bridge to and spacing it from the magnet, for each magnet pole an independently adjustable pole-piece carried by the bridge, and a damping disk rotatively carried by the coil between the magnet poles and the adjustable pole-pieces.

In testimony whereof I have affixed my signature in presence of two witnesses.

WALTER E. BEEDE.

Witnesses:
 WM. ASHLEY KELLY,
 BERNARD COWEN.